United States Patent [19]
Palmer

[11] Patent Number: 5,684,715
[45] Date of Patent: Nov. 4, 1997

[54] INTERACTIVE VIDEO SYSTEM WITH DYNAMIC VIDEO OBJECT DESCRIPTORS

[75] Inventor: Douglas L. Palmer, Foothill Ranch, Calif.

[73] Assignee: Canon Information Systems, Inc., Costa Mesa, Calif.

[21] Appl. No.: 475,984

[22] Filed: Jun. 7, 1995

[51] Int. Cl.$^6$ .............................. G06K 15/00; H04N 7/08
[52] U.S. Cl. ................. 364/514 C; 345/157; 364/514 R; 395/358; 395/326; 395/806; 348/473
[58] Field of Search ...................................... 395/152, 142, 395/143, 154, 135, 161, 159, 155, 156, 157, 140, 358, 806, 326; 364/514 R, 514 A, 514 C; 348/396, 473; 358/335, 311, 346, 342; 345/145, 189, 207, 167, 157, 118, 115, 139, 185, 186, 22, 27

[56] References Cited

U.S. PATENT DOCUMENTS

| | | | |
|---|---|---|---|
| 4,672,541 | 6/1987 | Bromley et al. | 463/3 |
| 4,786,967 | 11/1988 | Smith, III et al. | 348/485 |
| 4,857,902 | 8/1989 | Naimark et al. | 345/167 |
| 5,010,500 | 4/1991 | Makkuni et al. | 395/358 |
| 5,146,556 | 9/1992 | Hullot et al. | 395/348 |
| 5,155,806 | 10/1992 | Hoeber et al. | 395/338 |
| 5,493,513 | 2/1996 | Keith et al. | 364/514 R |
| 5,500,933 | 3/1996 | Schnorf | 395/806 |
| 5,519,828 | 5/1996 | Rayner | 395/326 |

OTHER PUBLICATIONS

"Inside MacIntosh—QuickTime", Apple Computer Inc., 1993, Chapters 1 and 2.
Microsoft Technical Newsletter, "AVI Files With Hotspots", David A. Feinleib, Microsoft Corporation, 1993.
"Programmer's Guide—Microsoft Video for Windows Development Kit", Microsoft Corp., 1992, Chapters 4, 7, 10 and Glossary.
"The Madness of Roland: An Ambitious, And Difficult, Interactive Novel", David Barton, Computer Select, Jul. 1993.
"Movie–Maps: An Application of an Optical Videodisc to Computer Graphics", Andrew Lippman, Computer Graphics Quarterly Report of SIGGRAPH-ACM, Jul. 1980, pp. 32–42.
"Object–Oriented Video: Interaction With Real–World Objects Through Live Video", Masayuki Tani, et al., CHI '92, pp. 593–598.
"Automatic Structure Visualization for Video Editing", Hirotada Ueda, et al., Interchi '93, pp. 137–141.
"VideoMAP and VideoSpaceIcon: Tools for Anatomizing Video Content" Yoshinobu Tonomura, et al., Interchi '93, pp. 131–136.
"Interactive TV Arrives", Connie Guglielmo, et al., Digital Media, Jul. 22, 1992, pp. 20–24.

*Primary Examiner*—Wellington Chin
*Assistant Examiner*—Melissa Kay Carman
*Attorney, Agent, or Firm*—Fitzpatrick, Cella, Harper & Scinto

[57] ABSTRACT

An interactive video system by which an operator is able to select an object moving in a video sequence and by which the interactive video system is notified which object was selected so as to take appropriate action. Interactive video is achieved through generation and use of video object descriptors which are synchronized to objects in the video sequence. Video object descriptors are generated by a generating tool which decomposes frames of video sequences and tracks movement of objects in those frames so as to generate a frame sequential file of video object descriptors. The file of video object descriptors are then used by an event interpreter which detects a match between the position of a pointing device on a display containing the video sequence and the position of a video object descriptor. When a match is detected, an interactive video operation is performed, such as jumping to a new video sequence, altering flow of the interactive video program or the like.

11 Claims, 5 Drawing Sheets

INTERACTIVE VIDEO SYSTEM WITH DYNAMIC VIDEO OBJECT DESCRIPTORS

BACKGROUND OF THE INVENTION

1. Field of the Invention

The present invention concerns an interactive video system by which an operator is able to select an object moving in a video sequence and by which the video system is notified as to which object was selected. More particularly, the invention concerns a generator for generating dynamic object descriptors which correspond to objects moving in a video sequence, and an event interpreter for using the object descriptors in connection with playback of the video sequence so as to detect and act upon operator selection of the objects.

2. Description of the Related Art

Current video systems have the ability to exploit random access capabilities of video storage media and allow an operator to access a video sequence randomly. For example, video disk games have been developed whose video sequences are retrieved and displayed based on user selection of objects in the video sequence, and video travel guides have been developed which allow an operator to navigate through streets of a city and to display different scenes from the city based on operator selection of left turns, right turns, etc.

Such systems have been put into wide and effective use in connection with information, educational and entertainment purposes.

Difficulties, however, have been encountered in connection with use of such systems in ordinary motion video sequences in which successive frames of video information are displayed to an operator, such as in an ordinary video tape or video disk system. Specifically, an operator's interaction with and control of such video sequences has largely been limited to external interactive control, such as to play, stop, pause, fast-forward, reverse, etc, or to control based on selection of static areas in a display screen. There is thus a need to enhance interactivity with video sequences, and particularly a need to permit interactivity based on selection of objects within the video sequence, objects which may move from frame to frame.

SUMMARY OF THE INVENTION

The invention addresses these needs by providing an interactive video system by which an operator is able to select an object moving in a video sequence and by which the system is notified which object was selected so as to take appropriate action. Highly interactive video is therefore possible, whereby an operator is able to interact with the motion video as it is displayed on the computer screen, for example, by jumping to other video sequences based on interaction with the motion video currently being displayed. Other actions are also possible, for example, to create hyperlinks between objects in a video sequences and other video sequences or computer generated sequences (for example, computer-generated text giving facts about a selected object), to create the illusion that an operator has changed the behavior of an object in the video by jumping or seeking seamlessly to a new contiguous sequence that changes the video image of the object, to provide a table of contents and/or index to a video that is accessed by direct interaction with objects in the video, or to provide navigational control through a computer program that is intuitive and directly related to video content.

Interactive video according to the invention is achieved through generation and use of video object descriptors which are synchronized to objects in the video sequence. More particularly, synchronized and dynamic object descriptors are regions on a display device within a moving video image where a pointing device can be activated. The descriptors are "dynamic" in the sense that their position, shape, size and layered relationship within the video image changes together with the video image. The objects descriptors are "synchronized" in that they change in synchronism with the video image. Preferably, the object descriptors are defined in a computerized file which contains various attributes concerning the descriptors, such as attributes defining position, shape, size, layered relationship, duration, identification name, action to be taken, and action parameters.

The invention concerns two different aspects of video object descriptors: generating such descriptors, and using such descriptors by means of an event interpreter which interacts with the video sequence. According to the generating aspect, the invention provides an interactive object descriptor generating tool which operates in any one of a manual mode, an automatic mode, or a hybrid mode, to create a computerized file containing synchronized and dynamic object descriptors. In the manual mode of operation, the generator allows an operator to position, shape, size and move an object descriptor region over a video image while the video image is playing in order to generate a file of object descriptors. In the automatic mode of operation, the generator uses image decomposition algorithms to decompose each video image frame into separate objects, each of which is correlated with objects for prior frames so as to generate needed attributes for each video object descriptor. In the hybrid mode of operation, both automatic and manual generation is permitted.

Thus, a video object descriptor generator according to the invention generates a frame-sequential file of video object descriptors from successive frames of video information by accepting an initial designation of video objects in a first video frame, decomposing subsequent frames of video information into constituent objects and identifying objects therein, tracking sequential positions of designated objects in sequential frames of video information, generating attributes corresponding to tracked video objects, and correlating frames of video information with identified objects, whereby a frame-sequential file of video object descriptors is output, each such descriptor including, for each successive frame, a frame identifier and a video object descriptor for each tracked object.

According to the use aspect of the invention, video object descriptors are used in an interactive video system through a playback apparatus which plays out the frames of video information and, at the same time, accesses the computerized file of video object descriptors. Based on a match between the position of a pointing device and the position of a video object descriptor, the interactive video apparatus can determine whether or not a video object has been selected. In response to such selection, the interactive video apparatus performs an interactive video operation such as jumping to a new video sequence, altering flow of a computer program, or the like.

Thus, a video event interpreter, according to the invention comprises a video source for providing successive frames of video information, an object descriptor source for providing synchronized object descriptors for objects in the successive frames of video information, a display for displaying the successive frames of video information and on which a user-manipulable cursor is superimposingly displayed, an active object list for storing spatial attribute information for valid video objects, said active object list being extracted from said object descriptors, a cursor position matcher for matching the position of the user-manipulable cursor to spatial attribute information in the active object list, an action map containing a list of actions initiated in a case where said cursor position matcher matches the position of the cursor to a valid object in a list of active video objects, and means responsive to user selection of a video object within the video sequence for activating a corresponding action in said action map.

This brief summary has been provided so that the nature of the invention may be understood quickly. A more complete understanding of the invention can be obtained by reference to the following detailed description of the preferred embodiment thereof in connection with the attached drawings.

DETAILED DESCRIPTION OF THE PREFERRED EMBODIMENT

Figure 1:
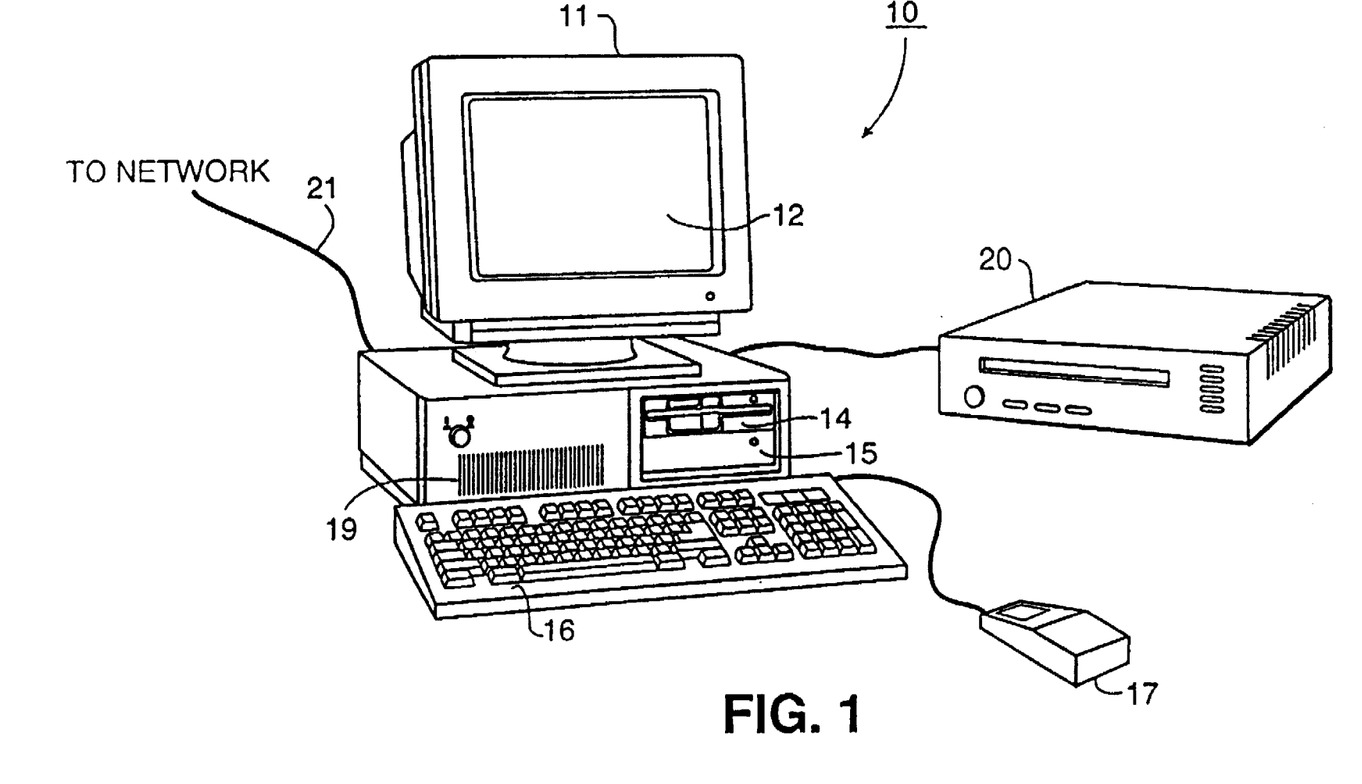
FIG. 1 is a view showing the outward appearance of a representative embodiment of the invention.

FIG. 1 is a view showing the outward appearance of a representative embodiment of the present invention. Shown in FIG. 1 is computing equipment 10 such as an IBM PC or PC-compatible computer having a windowing operating system such as an XWindows operating system or a Microsoft Windows operating system. Computing equipment 10 is provided with a display monitor 11 having a display screen 12 on which computing equipment 10 displays motion video images as well as computer-generated images to the user. Computing equipment 10 is further provided with a floppy disk drive 14 with which removable floppy disk media may be read or written, fixed disk drive 15 for storing data files and application program files, a keyboard 16 for permitting input of text data and manipulation of objects displayed on display screen 12, a pointing device 17 such as a mouse or the like which is also provided to permit manipulation of objects on display screen 12, and a combined speaker/microphone 18. A computer-controlled video source such as video laser disk player 20 is connected to computing equipment 10; if desired, other video sources may be used in addition to or in replacement for disk player 20, such as CD-ROM, CD-I, video tape player, video sequences stored on disk 15, or the like.

If desired, connections to a network 21 or the like may be provided to give computing equipment 10 access to network-based programs, data, and video sequences.

In accordance with operator instructions, and under control of the windowing operating system, stored application programs such as interactive video application programs are selectively activated to process and manipulate data.

Figure 2:
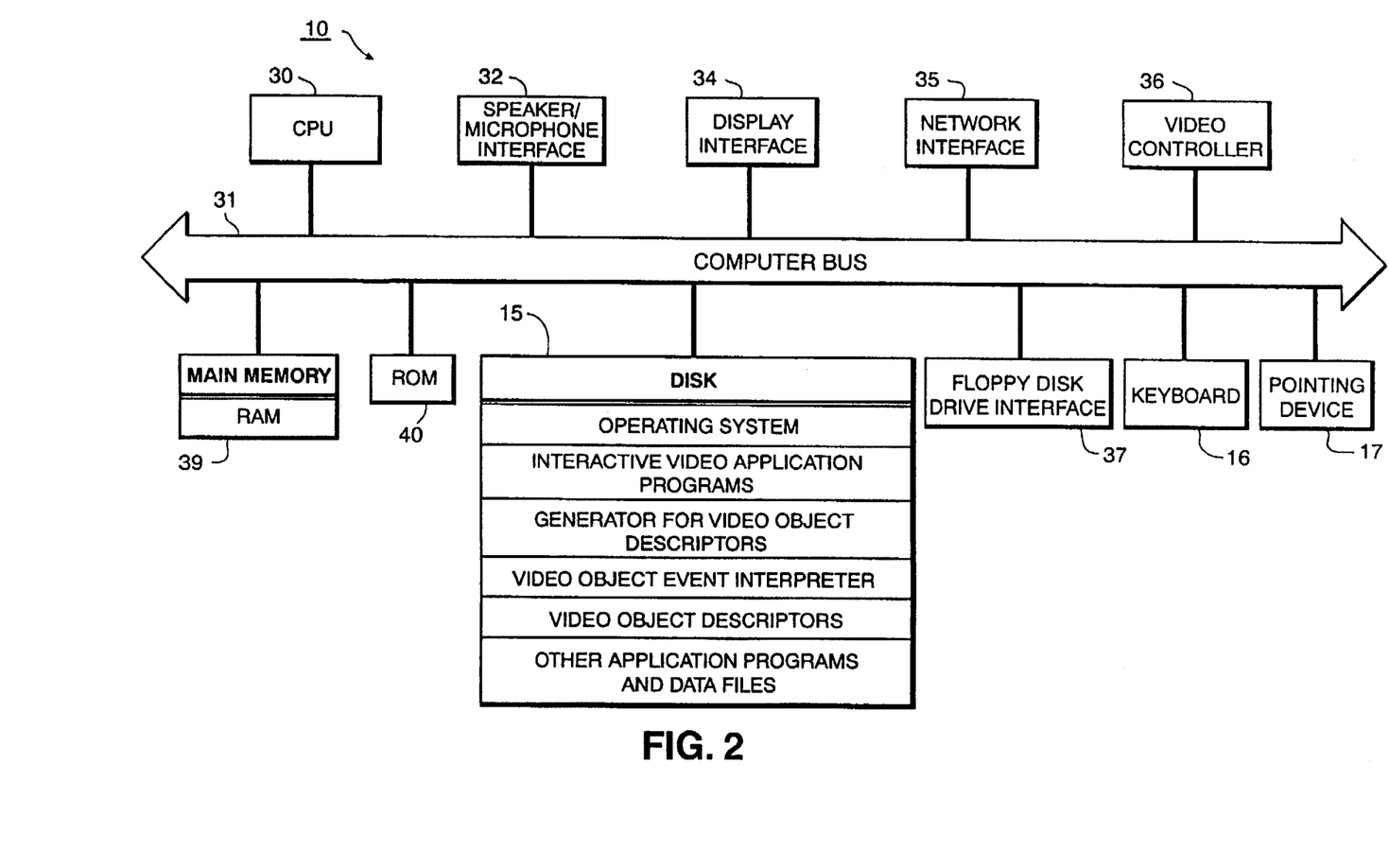
FIG. 2 is a detailed block diagram showing the internal construction of the FIG. 1 embodiment.

FIG. 2 is a detailed block diagram showing the internal construction of computing equipment 10. As shown in FIG. 2, computing equipment 10 includes a central processing unit (CPU) 30 such as a programmable microprocessor interfaced to a computer bus 31. Also interfaced to computer bus 31 is speaker/microphone interface 32, display interface 34, network interface 35, video controller 36 for controlling the video source, and floppy disk drive interface 37.

Main memory 39 such as random access memory (RAM) interfaces to computer bus 31 so as to provide CPU 30 with access to memory storage. In particular, when executing stored application program instruction sequences such as those associated with application programs stored on disk 15, CPU 30 loads those instruction sequences from disk 15 (or other storage media such as media accessed via network 21) into main memory 39 and executes those stored program instruction sequences out of main memory 39.

ROM (read only memory) 40 is provided for storing invariant instruction sequences such as start-up instruction sequences or basic input/output operating system (BIOS) sequences for operation of keyboard 16.

As shown in FIG. 2, and as previously mentioned, fixed disk 15 stores program instruction sequences for the windowing operating system and for various application programs such as an interactive video application program, an application program for generating video object descriptors from a sequence of video frames, an event interpreter application program, and the like. In addition, stored on fixed disk 15 are files which contain video object descriptors for various video sequences, although, as mentioned above, such files can be stored in other media, such as being interleaved with the video source itself. Fixed disk 15 also stores other application programs and data files not specific to the present invention.

Figure 3:
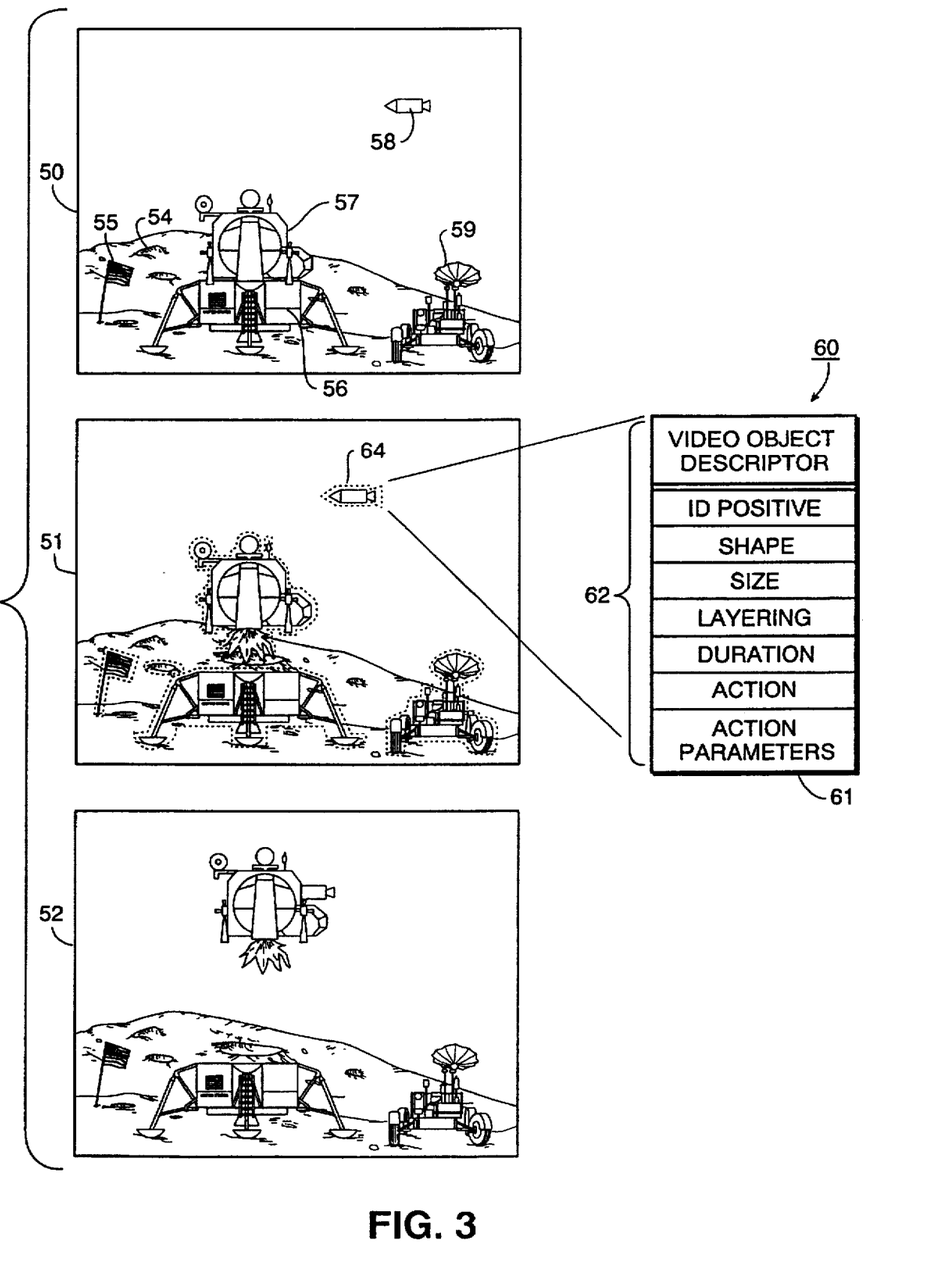
FIG. 3 is a view for illustrating the nature of video object descriptors.

FIG. 3 is a view for illustrating what a video object descriptor is, and how a video object descriptor relates to video objects in a sequence of motion video. In FIG. 3, 50, 51 and 52 represent three successive frames in a video sequence from a video source. Each frame contains a variety of objects, such as objects 54 through 59. Some of the objects, such as objects 54, 55, 56 and 59, are static objects, meaning that their position relative to the frame does not change from frame to frame. Other objects, such as objects 57 and 58, are moving objects, meaning that their position relative to the frame boundary changes from frame to frame. Objects can be static objects during one segment of a video frame sequence, and then become moving objects due to motion, camera panning and the like. Conversely, of course, moving objects can become static objects.

A video object descriptor 60 for one of the objects, namely object 58, is shown at 60. As seen there, a video object descriptor includes an identification part 61 and an attribute part 62. Attribute part 62 includes spatial information, temporal information, and action information. Spatial information includes information such as position, shape, size and layering of the video object. This is reflected at 64 in which the position, shape, size and layering of object 58 is delineated by a dotted line. Temporal information includes information such as the duration of the video object descriptor. The duration of the video object descriptor encodes information such as the applied time during which the video object descriptor is valid, for example, valid frame numbers for the video object descriptor. This information is used to encode the frame numbers during which it is permissible for a user to select the object. In addition, duration information may also be used in connection with compression of a file of video object descriptors: for static objects in particular, it may be permissible to compress a file of video objects descriptors such that a new descriptor is not needed for each object in each frame, but rather a single descriptor is needed which simply specifies the frame numbers during which the object is valid.

Action information specifies actions that are taken when a user selects a video object. For example, action information might specify a jump to a different frame sequence, or it might specify an alteration in the order of flow of a computer program.

Though not shown explicitly in FIG. 3, it is generally contemplated that each object in each frame of a motion video sequence will have a video object descriptor. Thus, there will be a separate video object descriptor for each of objects 54 through 59 in frame 50, a separate video object descriptor for each of objects 54 through 59 in frame 51, and so on. If storage of the video frame sequence permits, the file of video object descriptors may be interleaved with each frame of the video information. Alternatively, it is possible to create a separate file of video object descriptors which are synchronized temporally with each frame of the video sequence, for example, by reference to a common frame number. As mentioned above, it is also possible to compress the file of video object descriptors so as to minimize storage space required.

Figure 4:
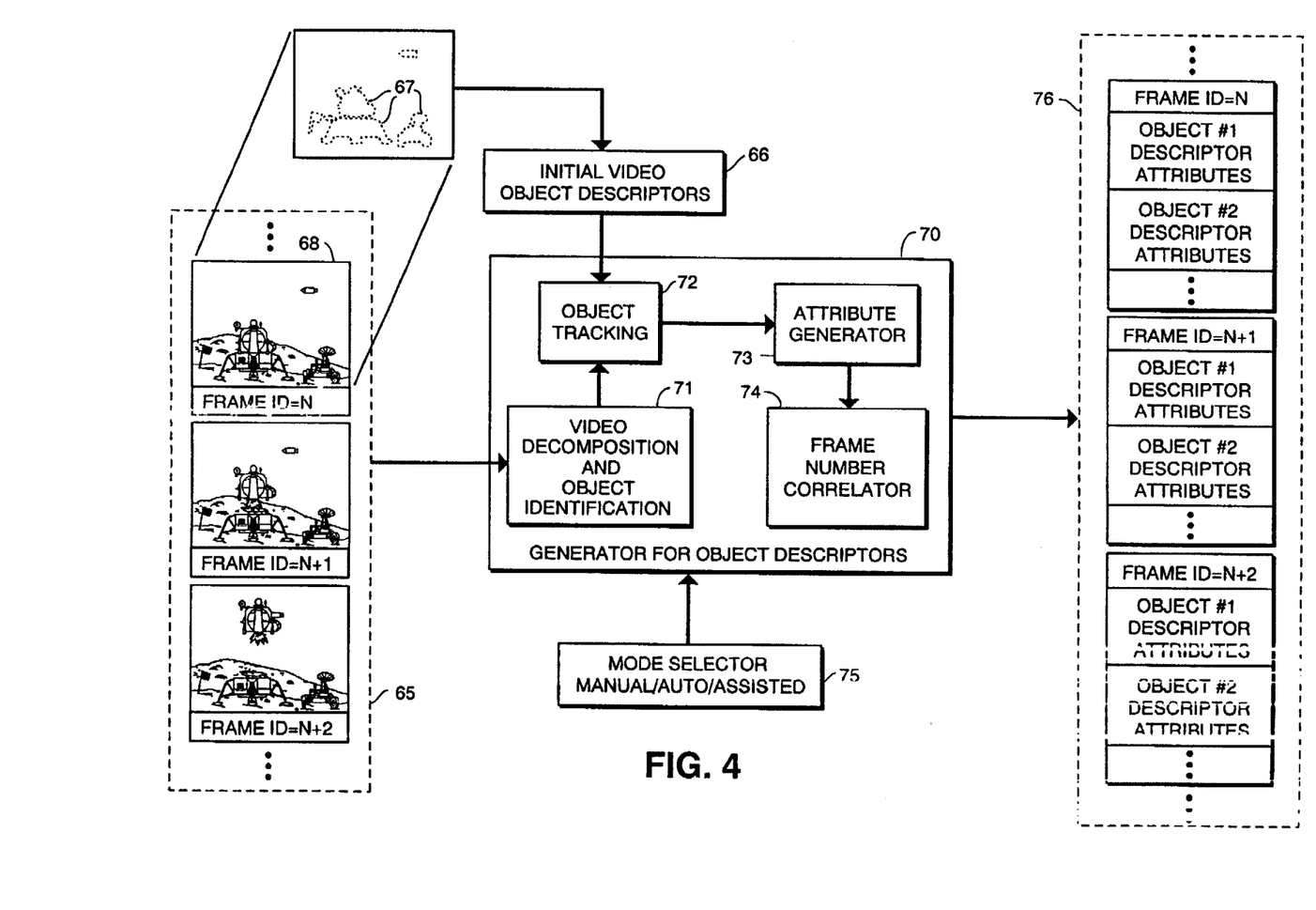
FIG. 4 is a view for explaining an apparatus which generates video object descriptors from a frame sequential sequence of video frames.

FIG. 4 is a view for explaining an apparatus which generates video object descriptors from a frame sequential sequence of video frames. The apparatus shown in FIG. 4 may be constructed as a stand-alone apparatus such as a special purpose computer or hard-wired apparatus, but more generally it is preferred to construct a video object generator such as that shown in FIG. 4 by a sequence of stored program instruction steps which are stored on disk 15 and executed by CPU 30 of computing equipment 10.

FIG. 4 is a view for illustrating how a file of video object descriptors is generated in correspondence to successive frames of video information from a video source. Generally speaking, in FIG. 4, an operational mode is selected for the generator which is operable in any one of a manual, automatic or assisted mode, and successive frames of video information are fed to the generator. Based on the frames of video information and on an initial set of video object descriptors, the generator generates a file of video object descriptors in which each frame of video information has a corresponding set of video object descriptors for each video object in the frame. Post-processing may be employed to modify the file of video object descriptors, such as be inserting action attributes into the video object descriptors, or such as by voiding the duration attribute of the video object descriptor. In addition, post-processing of the file of video object descriptors may be employed to reduce the size of the file of video object descriptors, such as by compression or other size-reduction techniques.

More specifically, FIG. 4 shows successive frames of video information 65 in which only three such successive frames have been shown for illustrative purposes. A set 66 of initial video object descriptors is obtained for each object 67 in an initial frame 68. Successive frames of video information and the set of initial video object descriptors 66 is then fed to a generator 70 which includes a video decomposition and object identification unit 71, an object tracking unit 72, an attribute generator 73, and a frame number correlator 74. The video decomposition and object identification unit 71 is responsible for decomposing video information in each successive frame of video information and identifying video objects in each such frame. Object tracking unit 72 is responsible for tracking motion of each object identified by video decomposition and object identification unit 71, based on a traced history of each such object. To initialize the trace of each object, object tracking unit 72 relies on initial video object descriptors 66 so as to obtain a base line set of video objects in the successive frames 65 of video information. Attribute generator 73 generates attributes for each video object tracked by object tracking unit 72. Attribute generator 73 is responsible for determining spatial information such as the position, shape, size, and layering information of each video object, temporal information such as the duration of each video object, and action attributes for each video object. Ordinarily, action attributes will simply be carried over from the initial set of video object descriptors 66. However, as new video objects are introduced by successive frames of video information, or as old video objects eventually move out of frame, attribute generator 73 can generate predefined action attributes such as a null (or "no-action") action attribute (which simply notifies an application program that a selection event has occurred), a default event-notification attribute, or the like.

Frame number correlator 74 correlates frame numbers from each successive frame 65 of video information to the video object descriptors whose attributes have been added by attribute generator 73. Frame number correlation is needed on playout of the video information so that it can be ensured that the file of video object descriptors is synchronized to the successive frames of video information.

Generator 70 is operable in any of plural modes set by mode selector 75. Illustrated here are three modes: a manual mode, an automatic mode, and an assisted mode. In manual mode, generator 70 allows real time interaction in frame-step interaction with a user. Real time interaction allows for quick and rough video object descriptor placement over time. Frame-step interaction adjustment allows for fine tuning of video object descriptor placement by stepping video frames one at a time or at slower than real-time.

In automatic mode, generator 70 uses image decomposition techniques to decompose each video image frame into pieces and objects. Suitable decomposition techniques can be found in the film industry where such techniques have been applied to computerized colorization of black and white films. Each frame of video information is then processed by generator 70 with video descriptor information automatically created in correspondence to the decomposed objects.

In the hybrid mode, generator 70 allows for a mix of automatic creation and manual interaction and editing. The hybrid mode also allows for rough manual specification of video object descriptors. The image decomposition technique used in the automatic mode can then use these rough specifications as a guide in object decomposition operations.

In operation, an initial set of video object descriptors 66 are derived from an initial frame 68 of successive frames 65 of video information. Successive frames of video information are then fed to generator 70 whose mode has been selected by mode selector 75. In accordance with the mode specified by mode selector 75, video decomposition and object identification unit 71 decomposes video information in each frame of video information and identifies objects in those frames. Object tracking unit 72, which relies on the initial set 66 of video object descriptors, creates a history of objects and how they move through the successive frames of video information. Object tracking unit 72 thus provides for continuity of objects from one frame to the next. Attribute generator 73 then generates spatial, temporal and action attributes for each video object, whereafter frame number correlator 74 correlates frame numbers for each successive frame 65 of video information to frame numbers for the video object descriptors in that frame. Generator 70 then outputs a file 76 of video object descriptors in which each frame of video information has a corresponding set of video object descriptors such that there is one descriptor, with associated attributes, for each object in each frame. Post-processing may then be employed, as discussed above, to edit any of the video object descriptors, such as by editing spatial, temporal or action attribute information, or by employing size-reduction techniques to reduce the overall size of video object descriptors.

Figure 5:
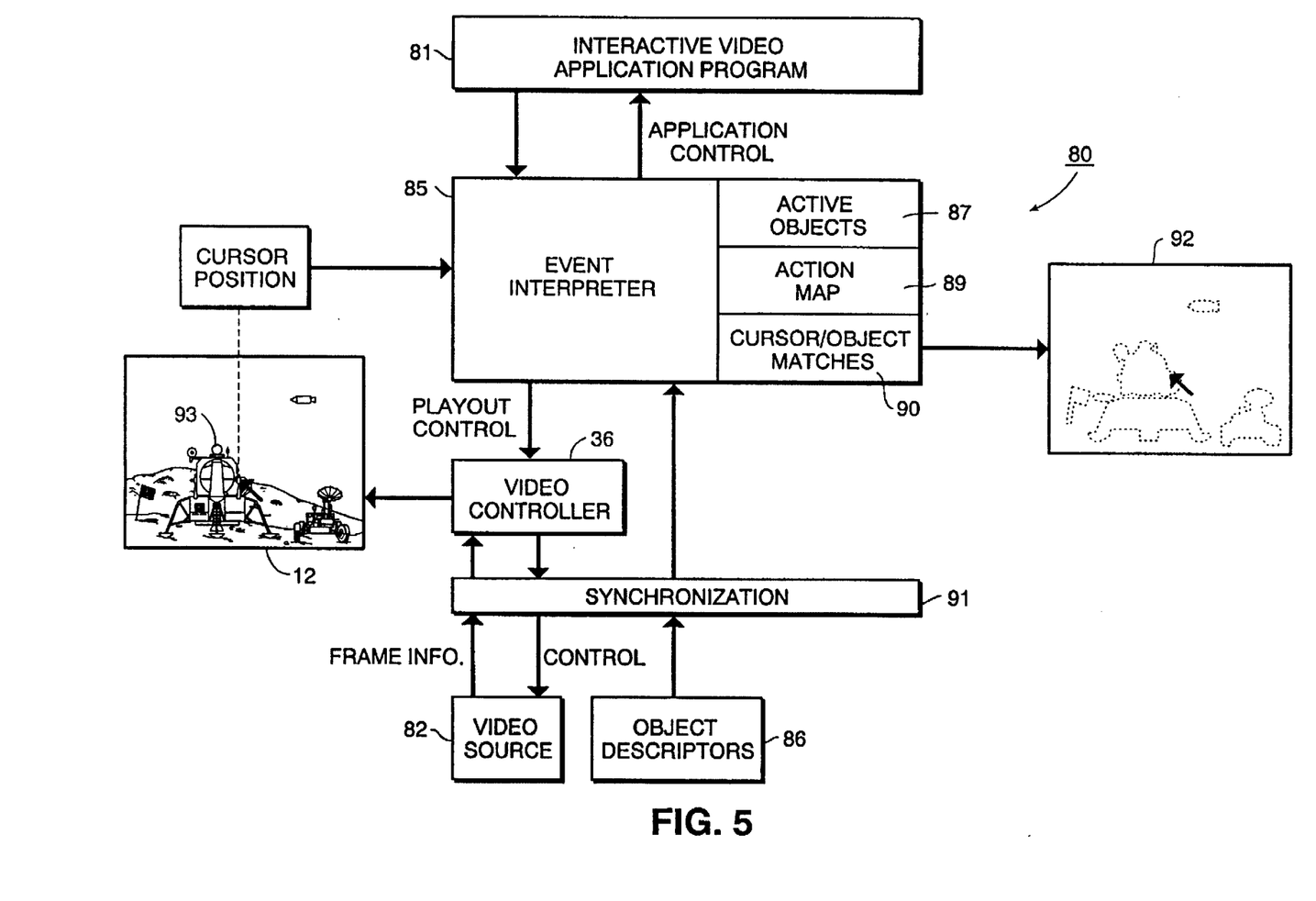
FIG. 5 is a view illustrating an interactive video apparatus which uses video object descriptors to play out successive frames of video information.

FIG. 5 is a view illustrating an interactive video apparatus which uses video object descriptors to playout successive frames of video information in a way that provides highly interactive video. In FIG. 5, an event interpreter is used to coordinate playout of successive frames of video information from the video source synchronously with playout of a file of video object descriptors, to extract lists of active video objects as well as an action map for actions which are taken when those video objects are selected, to determine when a user has selected a video object corresponding to an active video object by matching current cursor position on a display against the list of active objects, and to initiate execution of an associated action when a match is found.

In like manner to the generator illustrated in FIG. 4, the event interpreter shown in FIG. 5 may be constructed as a stand-alone device such as a specially programmed computer or hard-wired logic, but more preferably it is formed of computer executable process steps stored on disk 15 and executed by CPU 30 out of memory.

As specifically shown in FIG. 5, an interactive video apparatus 80 includes an interactive video application program 81 which is stored on disk 15 and executed by CPU 10. The interactive video application program 81 includes basic functionality of an interactive video application including playout commands for frames of video information from a video source 82 for display on display screen 12 (see FIG. 2), as well as for generation of computer-generated text such as might be displayed on display screen 12. The interactive video application program 81 interfaces to an event interpreter 85 which is responsible for intercepting cursor selection by the user and matching them to video object descriptors. Event interpreter 85 receives video object descriptors from a file of video object descriptors 86 and extracts from those video object descriptors a list 87 of active objects, and an action map 89 which includes a list of actions corresponding to all valid objects in the list 87 of active objects. Event interpreter 85 also includes a matcher 90 which matches between cursor position and the spatial information attributes stored in each valid active object. Event interpreter 85 includes an activator which, when a match is found, initiates the action listed in action map 89 such as by controlling the interactive video application program 81 or by controlling playout of video information from video source 82.

Event interpreter 85 interacts with video source 82 via video controller 36 (see FIG. 2) so as to cause successive frames of video information from video source 82 to be played out for viewing on display 12.

A synchronizer 91 is provided so as to afford synchronization between playout of successive frames of video information from video source 82 with playout of video object descriptors from the file 86 of video object descriptors. Synchronization is needed so as to ensure that the list 87 of active objects stored by event interpreter 85 corresponds to objects being displayed on display 12.

In response to a user command communicated from interactive video application program 81, event interpreter 85 controls video source 82 to playout successive frames of video information. Frame information is displayed on display 12 via video controller 36. In synchronism with playout of video information from video source 82, synchronizer 91 feeds the file 86 of video object descriptors to event interpreter 85. Event interpreter 85 extracts a list of valid and active video objects from the video object descriptors and stores those valid and active video objects in list 87. At the same time, event interpreter 85 stores an action map corresponding to actions which are taken when a video object currently displayed on display 12 is selected by the user. More specifically, cursor position information is fed to event interpreter 85 which employs a matcher to match when a cursor selection corresponds to selection of a video object in the list 87 of active video objects. This operation is illustrated schematically at 92 in which it is seen that a cursor selection has been made at a position which corresponds to video object 93 on display 12. When matcher 90 detects a match, event interpreter 85 accesses action map 89 so as to initiate activation of the action attributes stored in the selected video object descriptor. For example, the event interpreter can initiate activation of control over the interactive video application program 81, such as by altering flow or branching control in application program 81, by causing computer-generated text messages to appear on display 12, or the like. As another example, event interpreter 85 may initiate activation of a change in playout control for video source 82 so as to cause a change in playout sequence such as by jumping to a different video frame sequence. In the event of a change in playout sequence, synchronizer 91 causes object descriptors from file 86 to correspond to the jumped-to frame location.

While the invention has been described with respect to what are presently considered to be the preferred embodiments, it is to be understood that the invention is not limited to the disclosed embodiment. Rather, the invention is intended to cover various modifications and equivalent arrangements which are included within the scope and spirit of the appended claims.

What is claimed is:

1. A generator for generating a frame-sequential file of video object descriptors from successive frames of video information, comprising:

object designation means for accepting an initial designation of video objects in a first video frame;

a video decomposition and object identification unit for decomposing subsequent frames of video information into constituent objects and for identifying objects therein;

an object tracker for tracking sequential positions of designated objects in sequential frames of video information;

an attribute generator for generating attributes corresponding to video objects tracked by said object tracker; and a frame correlator for correlating frames of video information with objects identified by said video decomposition and identification unit;

whereby a frame-sequential file of video object descriptors is output, each such descriptor including, for each successive frame, a frame identifier correlated by said frame correlator and a video object descriptor for each object tracked by said object tracker.

2. A generator according to claim 1, wherein said video decomposition and object identification unit decomposes each frame of video information based on object specific techniques.

3. A generator according to claim 1, wherein said object tracking unit forms a history of objects so as to trace movement of an object from frame to successive frame.

4. A generator according to claim 1, wherein said attribute generator generates spatial attribute information, temporal attribute information, and action attribute information.

5. A generator according to claim 4, wherein said action attribute information is comprised of default information for action attributes.

6. A generator according to claim 1, wherein said generator is selectively operable in one of a manual mode, an automatic mode, and an assisted mode.

7. A generator according to claim 6, wherein in the manual mode said generator allows for real-time interaction and frame-step interaction or adjustment.

8. A video event interpreter, comprising:

a video source for providing successive frames of video information;

an object descriptor source for providing object descriptors that move in synchronism with movement of objects in the successive frames of video information;

a display for displaying the successive frames of video information and on which a user-manipulable cursor is superimposingly displayed;

an active object list for storing spatial attribute information for valid video objects, said active object list being extracted from said object descriptors;

a cursor position matcher for matching the position of the user-manipulable cursor to spatial attribute information in the active object list;

an action map containing a list of actions initiated in a case where said cursor position matcher matches the position of the cursor to a valid object in a list of active video objects; and means responsive to user selection of a video object within the video sequence for activating a corresponding action in said action map.

9. A video event interpreter according to claim 8, wherein said action map includes steps to control playout of the successive frames of video information from the video source.

10. A video event interpreter according to claim 8, wherein said action map includes steps for altering flow of an interactive video application program.

11. A video event interpreter according to claim 8, further comprising a synchronizer for synchronizing playout of frames from said video source with access to said object descriptors.

* * * * *